Oct. 23, 1962    W. P. OEHLER ETAL    3,059,705
PLANTER FRAME
Filed Dec. 31, 1956    5 Sheets-Sheet 1
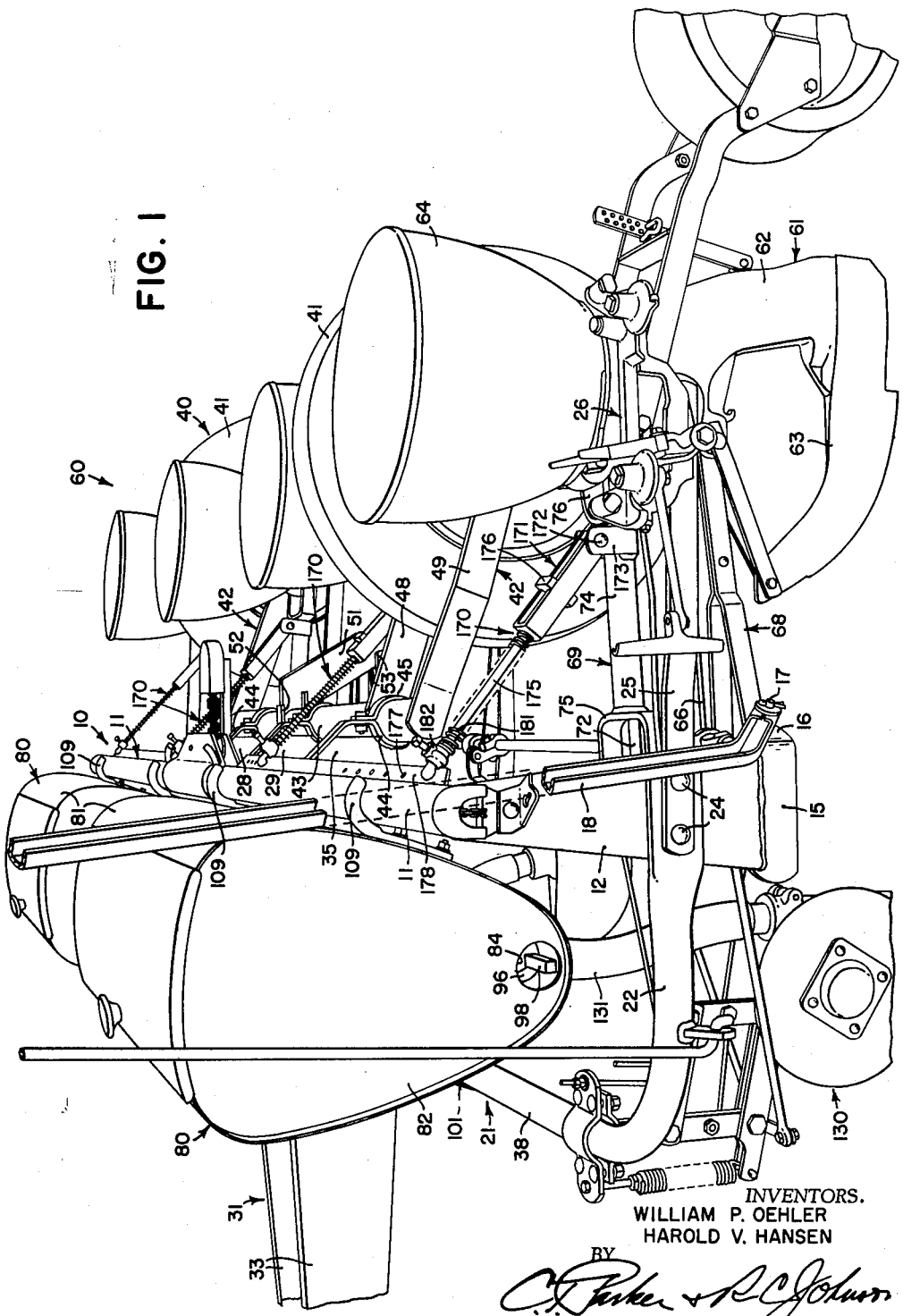
INVENTORS.
WILLIAM P. OEHLER
HAROLD V. HANSEN
BY
ATTORNEYS Oct. 23, 1962  W. P. OEHLER ETAL  3,059,705
PLANTER FRAME
Filed Dec. 31, 1956  5 Sheets-Sheet 2
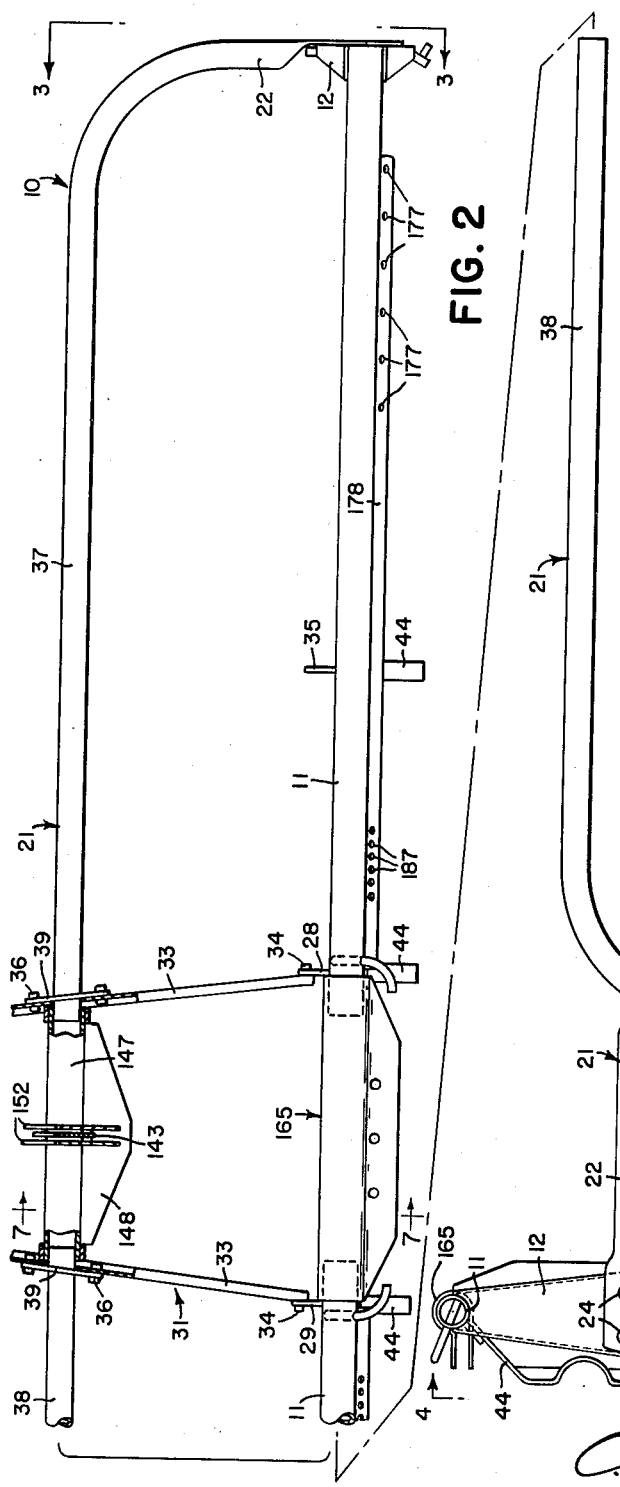
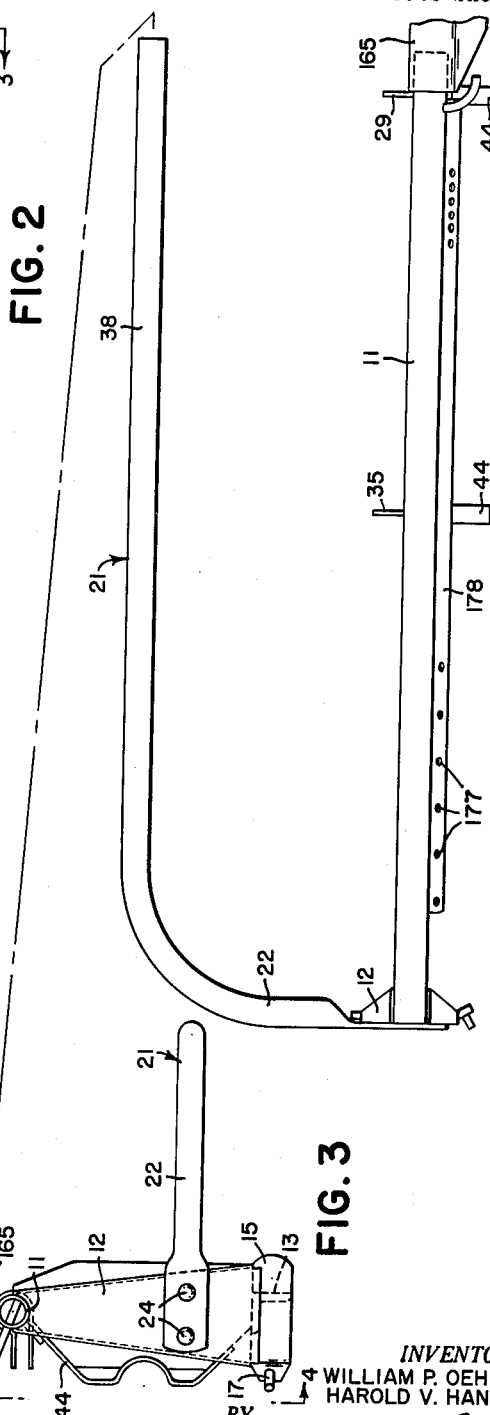
INVENTORS.
WILLIAM P. OEHLER
HAROLD V. HANSEN
BY
ATTORNEYS

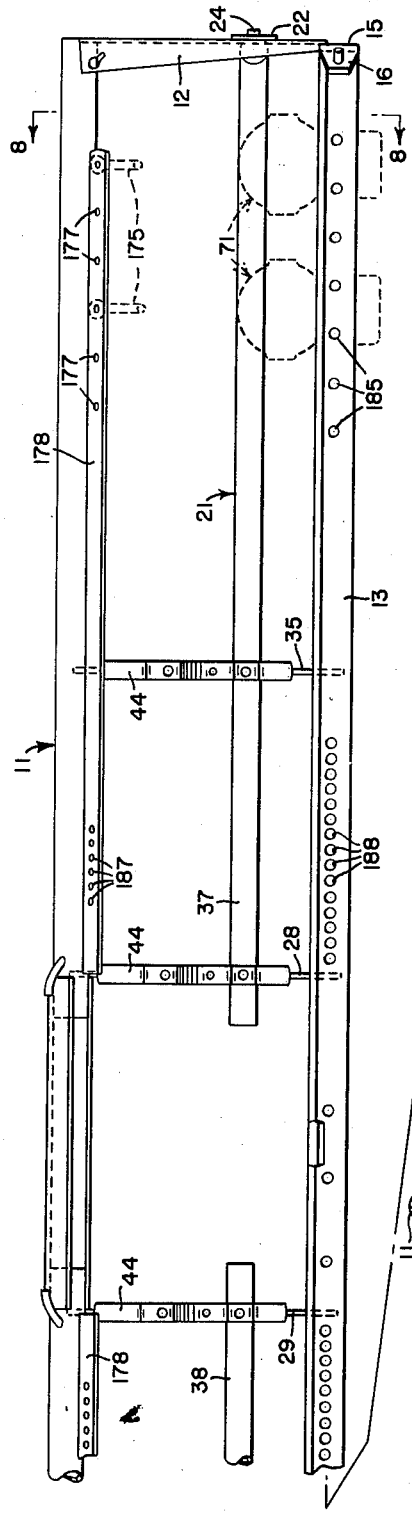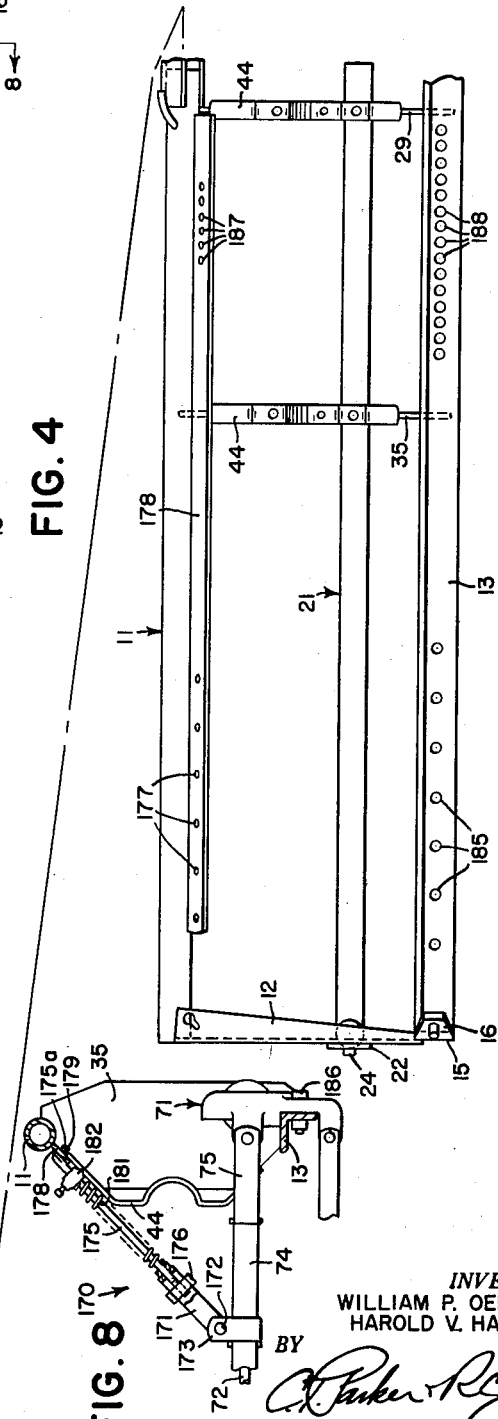

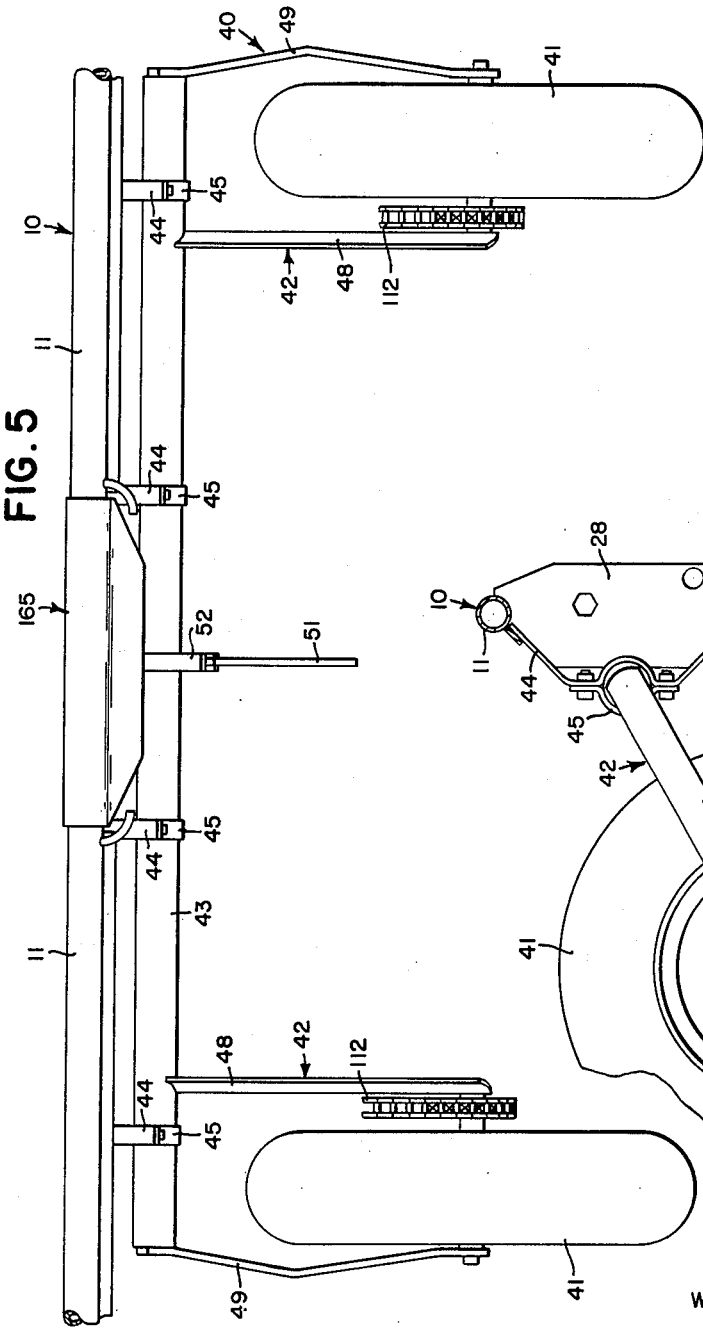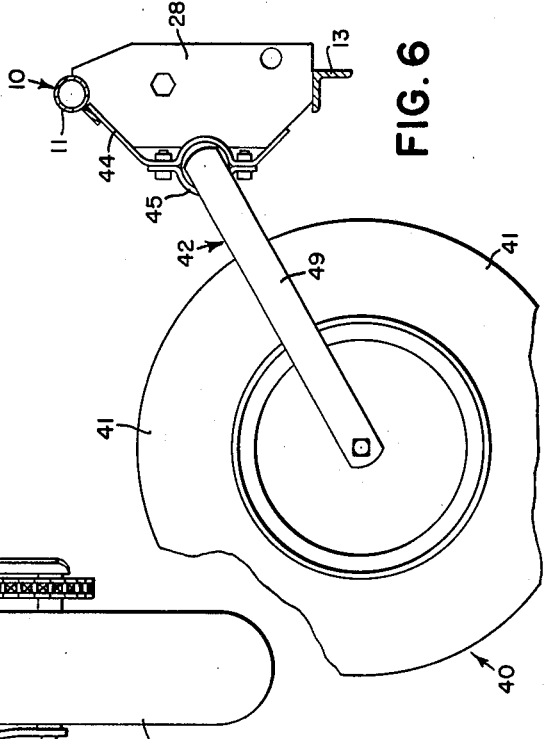

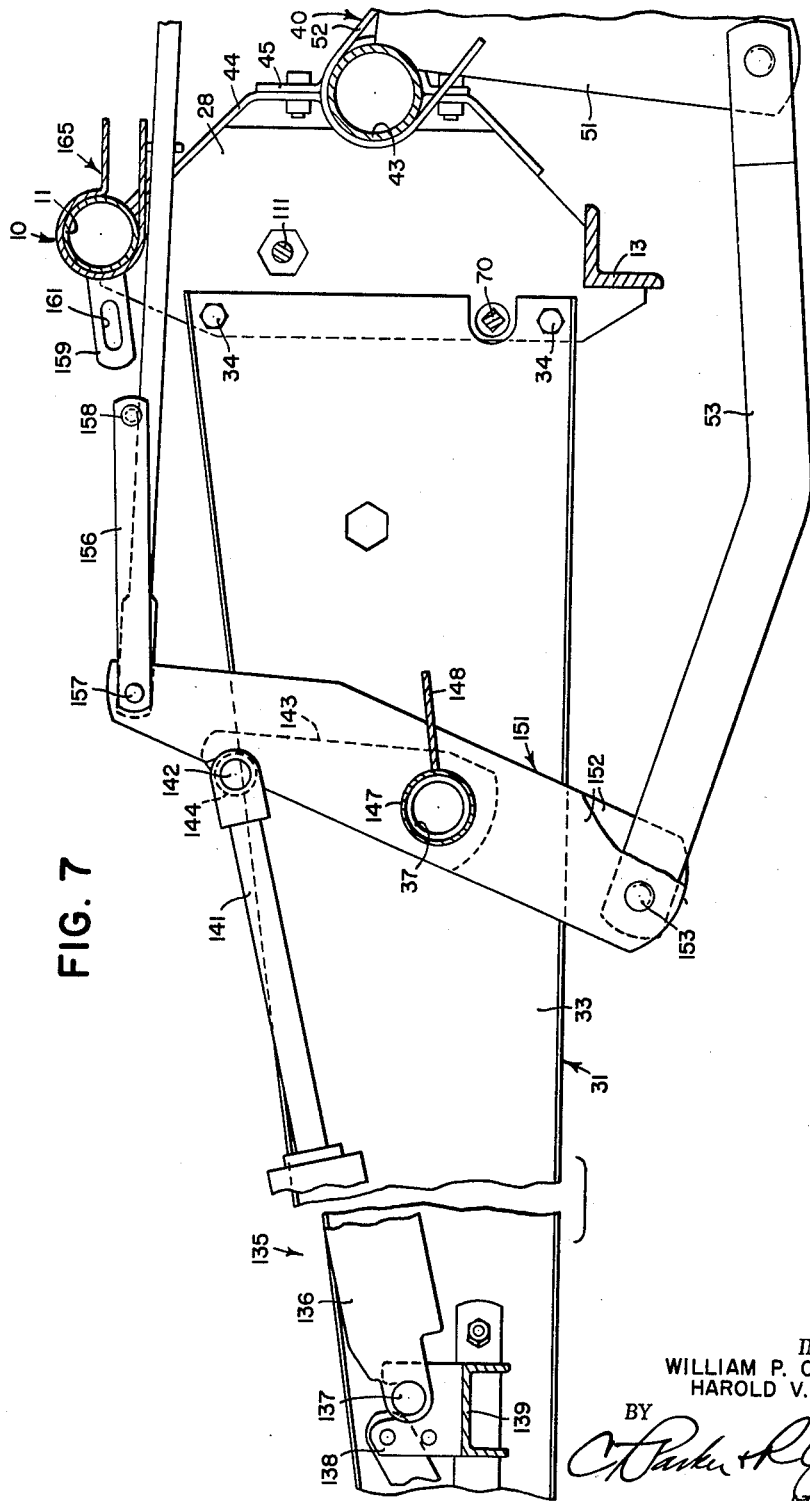

3,059,705
PLANTER FRAME
William P. Oehler, Moline, and Harold V. Hansen, Hillsdale, Ill., assignors, by mesne assignments, to Deere & Company, a corporation of Delaware
Filed Dec. 31, 1956, Ser. No. 631,953
11 Claims. (Cl. 172—413)

The present invention relates generally to agricultural implements and more particularly to multi-row planters and the like, particularly those having both planting and fertilizing units.

The object and general nature of the present invention is the provision of a new and improved frame structure for the above-mentioned type of implement, embodying two or more generally vertically spaced apart transversely extending main frame or sill members with means at the ends rigidly connecting said members, and also having a forwardly disposed generally transverse frame member also rigidly connected with the other members. It is a further feature of this invention to include, in addition, a forwardly extending draft frame which is connected at its rear end with certain intermediate generally vertically disposed members or plates that connect the upper and lower sill members or bars of the main frame.

Further, it is another feature of this invention to provide wheel frame means associated with the above-mentioned main frame, the wheel frame being swingable about a generally transverse axis so as to raise and lower the main frame, the wheel frame including wheel-carrying arms disposed between certain of the planting units, which are connected so as to extend rearwardly from the main frame. Still further, the draft frame is provided with power cylinder means which is connected with an arm on the wheel frame for swinging the latter to raise and lower the planter, the connection also including lockup means whereby the wheel frame may be locked in a lower position, to accommodate removal of the power cylinder, so as to hold the planter in a transport position.

These and other objects and advantages of the present invention will be apparent to those skilled in the art after a consideration of the following detailed description, taken in conjunction with the accompanying drawings, in which:

FIG. 1 is a perspective view of a four-row planting and fertilizing distributing implement in which the principles of the present invention have been incorporated.

FIG. 2 is a plan view of the implement frame, certain parts being shown in section and other parts omitted for purposes of clarity.

FIG. 3 is an end view of the implement frame.

FIG. 4 is a rear elevation of the frame, being a view taken generally along the line 4—4 of FIG. 3.

FIG. 5 is a fragmentary plan view of the wheel frame, with certain parts of the main frame, particularly the upper sill bar thereof.

FIG. 6 is an end elevation of the parts shown in FIG. 5.

FIG. 7 is an enlarged sectional view, corresponding generally to a view taken along the line 7—7 of FIG. 2, with portions of the draft frame and operating means for the wheel frame added thereto.

FIG. 8 is a fragmentary sectional view taken along the line 8—8 of FIG. 4 and in addition shows certain details of the laterally adjustable attaching means for the planting units.

The planter of the present invention, as best shown in FIG. 1, comprises a main frame 10 that is made up of an upper sill bar, preferably in the form of a pipe, shown at 11, a pair of vertical end sections or members 12, generally triangular in configuration and secured in any suitable way, as by welding, at their upper ends to the ends of the upper sill pipe 11. The frame 10 also includes a lower transverse frame member 13, preferably in the form of an angle that extends from one end to the other of the frame 10, each end of the angle member 13 being secured, as by welding, to the lower end of the associated end section 12 through a longitudinal or fore-and-aft extending part 15 that has one end 16 extended rearwardly and laterally inwardly, carrying a stud 17 that forms the bearing for the associated marker arm 18, only the lower portion of which is shown in FIG. 1. The part 15 is also securely fixed, as by welding, to the lower or base portion of the associated end section 12.

The main frame 10 also includes a front frame or pipe member 21 having its ends bent rearwardly, as indicated at 22, and flattened so as to fit against the outer face of the associated end section 12. The flattened section is apertured to receive a pair of attaching bolts 24 that also extend through apertures in the associated end section 12, and the bolts 24 also pass through the forward portion of an associated check head support bar 25 which at its rear end carries a check head 26 which is conventional, so far as the principles of the present invention are concerned. Other vertical members, such as those indicated at 28 and 29, FIG. 1, cooperate with the end sections and rigidly secure the lower sill angle 13 to the upper sill pipe member 11 to form a rigid structure. The frame 10 further includes a draft frame section 31 that comprises a pair of forwardly extending generally vertically arranged plates 33, the rear ends of which are detachably secured in any suitable way, as by bolts 34, FIG. 7, to the intermediate vertical frame sections 28 and 29. The frame 10 also includes other intermediate vertical frame sections 35 to provide the desired rigidity in the frame 10. Preferably, the intermediate vertical sections 28, 29 and 35 are shaped to fit against the lower frame angle 13 and are welded thereto. As best shown in FIG. 2, the forward pipe member 21 includes a transverse intermediate section that is made up of right and left hand portions 37 and 38, each having its laterally inner end suitably connected to the associated draft frame member 33, as by an apertured connecting plate 39 secured by bolts 36 to the associated draft frame plate 33.

The implement shown in FIG. 1 is in the nature of a towed planter, the forward ends (not shown) of the draft frame members 33 being connected by suitable hitch means with a farm tractor or other suitable propelling means. The main frame 10 is raised and lowered into and out of transport and operating positions by virtue of ground-engaging means 40 that includes a pair of ground wheels 41 carried on a pair of wheel arms 42 that are fixed at their upper and forward ends to a rockable shaft member 43, preferably in the form of a pipe, journaled in pairs of inner and outer bearing brackets 44 and associated bearing straps 45 suitably bolted together and secured, as by welding, to the associated vertical frame sections 28, 29 and 35. Each wheel arm 42 includes an inner member 48 and an outer member 49 receiving the associated wheel 41 therebetween and secured, as by welding, to the rockable pipe member 43, preferably with the outer bearing parts 44 and 45 disposed between the members 48 and 49. An actuating arm 51 is securely fixed as by welding at its upper end to the generally central portion of the rockable pipe member 43, the connection being reinforced by a U-shaped strap 52 also welded to the arm 51 and to the pipe member 43, and the lower end of the arm 51 is apertured to receive a pair of straps 53 or other suitable means forming a forwardly extending link connected or adapted to be connected to a suitable operating mechanism, such as a hydraulic cylinder connected with, actuated by power derived from, and normally operated by means on the tractor for controlling implements. By virtue of such means, a force is exerted against the arm 51 to swing the wheel frame 42, 43, thus raising and lowering the implement as a unit relative to the ground.

The implement shown in FIG. 1 is provided with both seeding means and fertilizing means. The seeding means is indicated in its entirety by the reference numeral 60 and comprises a plurality of planting units 61, each including a generally vertically disposed shank casting 62 carrying at its lower end a furrow opening runner 63 and at its upper end a seed hopper 64 and associated seed-selecting and dispensing mechanism (not shown), which may be of any suitable construction, preferably like that shown, for example, in the U.S. Patent 2,340,163, issued January 24, 1944 to Charles H. White. As shown in the latter patent, such a planting unit includes suitable valve means operated by a link 66 (FIG. 1) that extends forwardly generally in parallelism with respect to lower link means 68 and upper link means 69 that connect each shank casting 62 with the associated frame 10. Preferably, the forward ends of the link members 68 and 69 are connected to an associated generally vertically disposed bracket fastened in any suitable way to the lower sill angle 13 of the frame 10. There is, of course, one bracket 71 (FIG. 8) for each planting unit 61, and the construction generally is similar to that shown in U.S. Patent 2,376,464, issued May 22, 1945 to Charles H. White, and hence further description appears to be unnecessary except to point out that the several brackets support a transverse extending drill shaft 70 that is connected through suitable gearing to drive a seeding shaft 72 that extends rearwardly to the seed dispensing mechanism in each of the planting units 61. The upper link 69 is in the nature of a pipe 74 through which the associated seeding shaft 72 extends, with front and rear yokes 75 and 76 pivotally connected to the associated bracket 71 and the forward portion of the runner shank 62, respectively.

The fertilizer dispensing means incorporated in the present implement comprises a pair of transversely elongated fertilizer hoppers or container 80. Each includes a hopper sheet 81 that is rolled to fit generally oval-like end plates 82, each of which has a lower opening 84. Distributing means in the form of an auger is disposed in the bottom of each hopper. The auger comprises a plurality of right and left hand auger sections 96, preferably in the form of castings, and a shaft 98 that is square in cross section and extends through correspondingly formed openings in the auger castings 96 and out through the associated openings 84. From FIG. 1 it will be noted that there are two planter units disposed substantially directly behind one elongated fertilizer hopper 80. Each hopper is swingably supported on the transverse portion of the front frame pipe member 21 by pivot means 101, as best shown in FIG. 1. Hook members 109 are fixed to the back side of the hopper 80 and engage over the upper portion of the associated upper sill pipe 11 when the hopper is in its normal or vertical position, as shown in FIG. 1. By virtue of the means just described, the weight of the hopper and its contents is divided substantially equally between the frame members 11 and 21.

As mentioned above, there are two hoppers 80 for the four planting units 60, and each hopper includes its own agitator and distributing means 96. Jackshaft means 111 (FIG. 7) is driven in any suitable way from the ground wheels 41, as by means including chains 112 (FIG. 5), and the jackshaft drives various mechanisms of the implement, including the fertilizer distributing means 96. For further details of the fertilizer dispensing means, reference may be made to our copending Patent 2,906,436, issued September 29, 1959.

The implement 10 also includes a pair of fertilizer furrow opening units 130, the details of mounting of which do not per se form any part of the present invention, but if desired, reference may be had to our copending Patent 2,975,844, issued March 21, 1961. It therefore suffices to note that fertilizer from the hopper 80 is delivered to the units 130 through a pair of flexible conduits 131 and that the upper end of each of the conduits 131 is releasably connected with the associated hopper.

The wheel frame unit 40 is operated by power means indicated in its entirety by the reference numeral 135 and comprises a power cylinder 136 pivotally connected, as at 137, at one end to releasable bracket means 138 carried by a cross channel 139 that forms a part of the forward portion of the draft frame 31. The rear portion of the unit 136 takes the form of a piston 141 and this part is pivotally connected, as at 142, with a swingable arm 143 carrying a bushing 144 that is concentric with the pivot 142, receiving the latter, and is rigidly secured, as by welding, to the outer or upper end of the arm 143. The latter member is swingable on a pipe section 147 that extends from side to side between the plate members 33 of the draft frame 31. The pipe section 147 is reenforced by a transverse triangular plate section 148, and the pipe section 147 is rockably mounted on the adjacent portions of the pipe sections 37 and 38 that extend through openings in the draft frame plates 33 into the space between the latter. Secured to and forming a part of the pipe section 147 is a generally vertically extending lever 151 that comprises two bars 152 that are welded in spaced apart relation to the pipe section 147, and the lower ends of the bars 152 are apertured to receive pivot means 153 by which the forward ends of the actuating link 53 is connected with the power operating means 135. The arm 143 is swingable between the bars 152 but the bushing 144 is engageable with the forward edges of the upper portions of the bars 152, whereby when the unit 136 is extended, the lever 151 is power operated to exert a pull through the link 53 and thus rock the pipe member 43 of the wheel frame unit 40 in a clockwise direction as viewed in FIG. 7. This movement lowers the wheels 41 relative to the frame 10, and thus raises the latter and all parts mounted thereon into a transport position. A link 156 is pivoted at 157 to the upper end of the lever 151 and at its rear end carries a quick detachable pin 158 that is engageable with an apertured lug 159 that is fixed, as by welding, to the generally central portion of the frame 10. When the frame 10 is completely raised into a transport position, the end of the link 156 is disposable in alignment with a slot 161 in the lug 159, and then by inserting the pin 158, the wheel frame is locked in a transport position and the power unit 136 may be detached from the planter, if desired. The generally central portion of the frame 10 includes a U-shaped bracket 165 that, as best shown in FIG. 7, embraces the adjacent ends of the pipe members 11, and is securely fixed thereto as by welding. The apertured lug 159 is welded to the bracket 165.

Again referring to FIG. 1, it will be noted that each of the planter units 61 has its upper link member 69 connected with the planter frame 10 by a spring cushioned lifting strut 170. Each of these members includes a lower U-shaped yoke 171 connected by pivot means 172 with a bracket 173 that is fixed, as by welding, to the rear portion of the associated pipe 74. The central or uppermost portion of the U-shaped yoke 171 is apertured to receive the lower end of a rod 175 that is slidable relative to the yoke 171. The lower end of each rod 175 is screw threaded and is adjustably disposed in a tapped opening formed in the block or nut member 176 that is slidably but nonrotatably disposed within the side sections of the yoke 171. The upper end of each rod 175 is reduced, as at 175a (FIG. 8), and disposable in any one of a number of apertures 177 formed in a transversely disposed strip 178 that is fixed to and forms a part of the upper sill pipe 11, as best shown in FIG. 1. A pin 179 serves to hold the upper end of each rod in the selected opening 177.

A pressure spring 181 is disposed about the associated rod 175 between the upper end of the yoke 171 and a set screw collar 182 that is adjustably fixed to the upper portion of the rod 175. The lower sill angle 13, generally below the openings 177 in the associated attaching strip 178, is provided with a plurality of openings 185 adapted to receive bolt means 186 or the like (FIG. 8) by which the associated bracket 71 may be attached in different lateral positions to the angle 13. The bracket 71 preferably is in the form of a housing enclosing the gears or other means that transmits power from the drill shaft 70 to the associated seeding shafts 72. Thus, by removing the pin 179 and bolts 186, each planting unit may be shifted laterally along the lower sill angle 13 and the upper attaching strip 178 so as to provide for change of row spacing. For example, two possible positions for the righ hand outer planter unit are indicated in dotted lines in the upper right hand portion of FIG. 4.

To accommodate changes in the position of the laterally inner planting units 61, the upper strip 178 is provided with a plurality of openings 187 and the lower sill angle 13 is provided with a similar set of openings 188. These latter openings are spaced apart only about half the distances between the openings 177 and 185 since to change the row spacing, it is necessary to vary the positions of the latter outer units twice the amount the positions of the inner planter units are varied.

While we have shown and described above the preferred structure in which the principles of the present invention have been incorporated, it is to be understood that our invention is not to be limited to the particular details, shown and described above, but that, in fact, widely different means may be employed in the practice of the broader aspects of our invention.

What we claim, therefore, and desire to secure by Letters Patent is:

1. In a multi-row planter, frame means comprising a front frame member having rearwardly extending end sections and an elongated generally laterally arranged intermediate section, an upper transverse bar, generally vertical end members connected at their upper ends, respectively, to the outer ends of said upper bar and at their lower end portions, respectively, to said rearwardly extending end sections, a lower transverse frame bar generally parallel to the upper transverse frame bar and connected at its ends with said rearwardly extending end sections, a pair of generally vertical braces disposed in laterally spaced apart position and connected at their upper and lower ends to the generally intermediate portions of said upper and lower transverse frame bars, wheel frame means swingably connected with said braces at the upper portions thereof and carrying ground engaging wheels, said ground engaging wheels being swingable downwardly and forwardly to raise said frame means, and fertilizer container means carried by said frame means generally between said front frame member and said upper transverse bar.

2. In a planter, a generally transverse main frame including upper and lower generally vertically spaced apart transversely extending sill bars, means including laterally spaced apart vertical members rigidly interconnected at their upper and lower ends with the intermediate portions of said upper and lower sill bars at laterally spaced apart points thereon, a draft frame extending forwardly from said main frame and including two generally vertically disposed forwardly extending plate members fixed at their rear ends to said vertical members between said upper and lower sill bars, a wheel frame swingably connected with said main frame and including a rockshaft rotatably connected with said vertical members between said upper and lower sill bars, and means connected to act between said draft frame and said wheel frame to shift the latter and raise and lower said main frame.

3. In a planter, a generally transverse main frame including upper and lower sill bars and a forwardly disposed bar, means rigidly interconnected with the intermediate portions of said upper and lower sill bars, a wheel frame swingably mounted on said last-mentioned means, ground wheels carried thereby, a draft frame extending forwardly from said main frame and including two generally vertically disposed forwardly extending plate members fixed at their rear ends to said last-mentioned means in laterally spaced apart relation, an arm fixed to said wheel frame and extending generally downwardly to a position below and rearwardly of said lower sill bar, a power cylinder carried by said draft frame between the plate members thereof, a vertically disposed lever pivoted to said draft frame between said plate members and having one end connected with said cylinder and the other end extending generally downwardly to a position below and forwardly of said lower sill bar, and a connection between the lower end of said vertically disposed lever and the lower end of said arm for swinging said wheel frame by power derived from said cylinder.

4. The invention set forth in claim 3, further characterized by said forwardly disposed bar including portions lying between said draft frame plate members, and said lever being pivotally mounted on said bar portions between said plate members.

5. The invention set forth in claim 4, further characterized by lock-up means connectible between the upper end of said lever and said upper sill bar.

6. In a planter, a generally transverse main frame including upper and lower sill bars and a forwardly disposed generally U-shaped bar comprising a transverse part formed with curved end portions extending rearwardly, vertical end members secured to the ends of said upper and lower sill bars and receiving said rearwardly curved end portions, means fixing said end portions to said vertical end members above the lower sill bar, a wheel frame swingably connected with the intermediate portion of said upper sill bar, and means swingably connected with the generally intermediate portion of said transverse part and connected with said wheel frame to swing the latter.

7. The invention set forth in claim 6, further characterized by a forwardly extending draft frame connected at its rear portions with said upper and lower sill bars and including laterally spaced apart vertically disposed plate members apertured to receive transversely extending portions of said forwardly disposed bar, said swingably mounted means being disposed between said laterally spaced apart plate members.

8. In a planter, a generally transverse main frame including upper and lower sill bars and a forwardly disposed generally U-shaped bar comprising a transverse part formed with curved end portions extending rearwardly, and vertical end members secured to the ends of said upper and lower sill bars and receiving said rearwardly curved end portions, means fixing said end portions to said vertical end members above the lower sill member, a forwardly extending draft frame connected at its rear portions with said upper and lower sill bars and including laterally spaced apart vertically disposed plate members, said U-shaped transverse part including right and left hand sections extending into the space between said plate members, a sleeve rockably disposed on said right and left hand sections and disposed between said plate members, a wheel frame swingably connected with said upper sill bar, and an operating connection between said rockable sleeve and said wheel frame.

9. The invention set forth in claim 8, further characterized by an arm fixed to said sleeve in a generally vertical position, means connecting the lower end of said arm with said wheel frame to swing the latter, and a locking link connected with the upper end of said arm and the adjacent portion of the upper sill bar for locking the wheel frame in a transport position.

10. The invention set forth in claim 8, further characterized by an arm fixed to said sleeve, a link connecting the lower end of said arm with the wheel frame and extending below said lower sill bar, and operating means connected with said sleeve to rock the latter.

11. The invention set forth in claim 10, further characterized by said arm including a portion extending generally upwardly from said sleeve, said operating means being connected to said upwardly extending arm portion.

References Cited in the file of this patent

UNITED STATES PATENTS

| | | |
|---|---|---|
| 713,818 | Tinsman | Nov. 18, 1902 |
| 2,363,749 | Rude | Nov. 28, 1944 |
| 2,368,134 | Haas | Jan. 30, 1945 |
| 2,498,887 | Hyland | Feb. 28, 1950 |
| 2,596,060 | Walz et al. | May 6, 1952 |
| 2,637,564 | Stratman | May 5, 1953 |
| 2,657,652 | Graham | Nov. 3, 1953 |
| 2,660,967 | Walz et al. | Dec. 1, 1953 |
| 2,701,513 | Hyland et al. | Feb. 8, 1955 |
| 2,704,021 | Brundage | Mar. 15, 1955 |
| 2,745,330 | Nelson | May 15, 1956 |